(12) United States Patent
Kikuchi

(10) Patent No.: US 6,289,202 B1
(45) Date of Patent: *Sep. 11, 2001

(54) SELECTING A RADIO CHANNEL FROM A GROUP OF RADIO CHANNELS WHERE AN INFLUENCE OF INTERMODULATION HAS BEEN CONSIDERED DURING SIMULTANEOUS COMMUNICATION WITH A PLURALITY OF RADIOS

(75) Inventor: Tohru Kikuchi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/681,866

(22) Filed: Jul. 29, 1996

(30) Foreign Application Priority Data

| Jul. 31, 1995 | (JP) | 7-194977 |
| Jan. 11, 1996 | (JP) | 8-002783 |
| Jul. 4, 1996 | (JP) | 8-175188 |

(51) Int. Cl.[7] .................. H04Q 7/20; H04B 1/38
(52) U.S. Cl. ............... 455/62; 455/67.1; 455/452; 455/526
(58) Field of Search ................. 455/62, 63, 67.1, 455/450, 451, 452, 115, 119, 120, 125, 442, 518, 516, 514, 513, 524, 526, 186.1

(56) References Cited

U.S. PATENT DOCUMENTS

| 4,419,766 | * | 12/1983 | Goeken et al. | 455/62 |
| 4,481,670 | * | 11/1984 | Freeburg | 455/62 |
| 4,549,311 | * | 10/1985 | McLaughlin | 455/62 |
| 4,751,725 | * | 6/1988 | Bonta et al. | 455/450 |
| 4,811,380 | * | 3/1989 | Spear | 455/437 |
| 5,144,466 | | 9/1992 | Nakamura et al. | |
| 5,295,138 | * | 3/1994 | Greenberg et al. | 455/62 |
| 5,377,221 | * | 12/1994 | Munday et al. | 455/63 |
| 5,666,651 | * | 9/1997 | Wang | 455/63 |

FOREIGN PATENT DOCUMENTS

| 5-48530 | 2/1993 | (JP) . |
| 7-87550 | 3/1995 | (JP) . |

OTHER PUBLICATIONS

English Language Abstracts of Japanese Patent Applications Nos. 5–48530 and 7–87550.

* cited by examiner

Primary Examiner—Lester G. Kincaid
(74) Attorney, Agent, or Firm—Morgan & Finnegan, L.L.P.

(57) ABSTRACT

An optimal channel is selected in correspondence with the radio environment of the setting place of a system. A plurality of channels are divided into a plurality of groups, and a communication is performed using a channel in a group selected according to the radio environment. Since channels in the group are selected to be free from intermodulation, even when a plurality of communications are simultaneously performed in the system, the communication using one channel can be prevented from influencing that using another channel.

40 Claims, 16 Drawing Sheets

F I G. 12
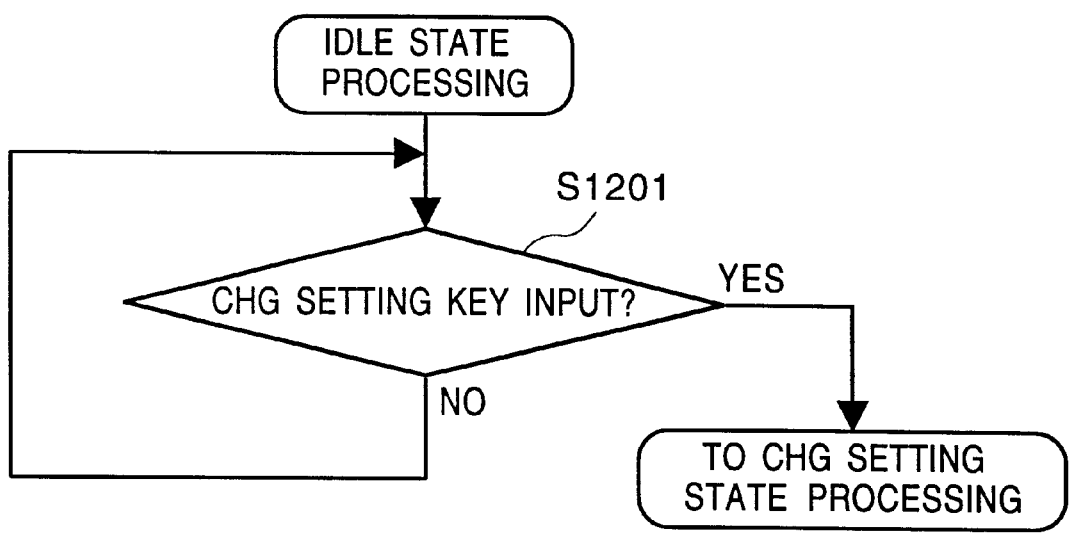

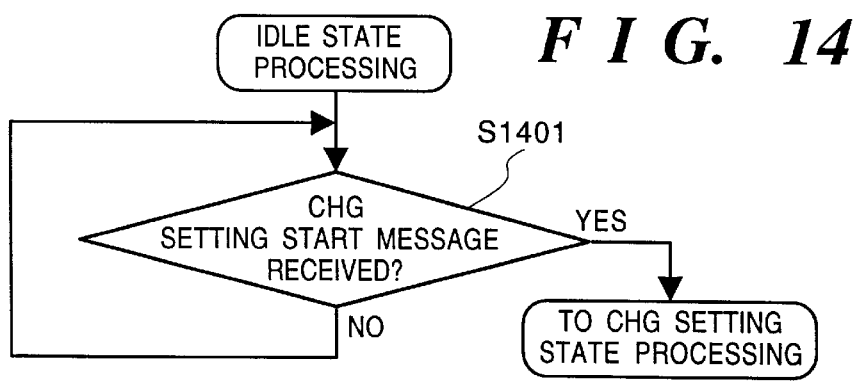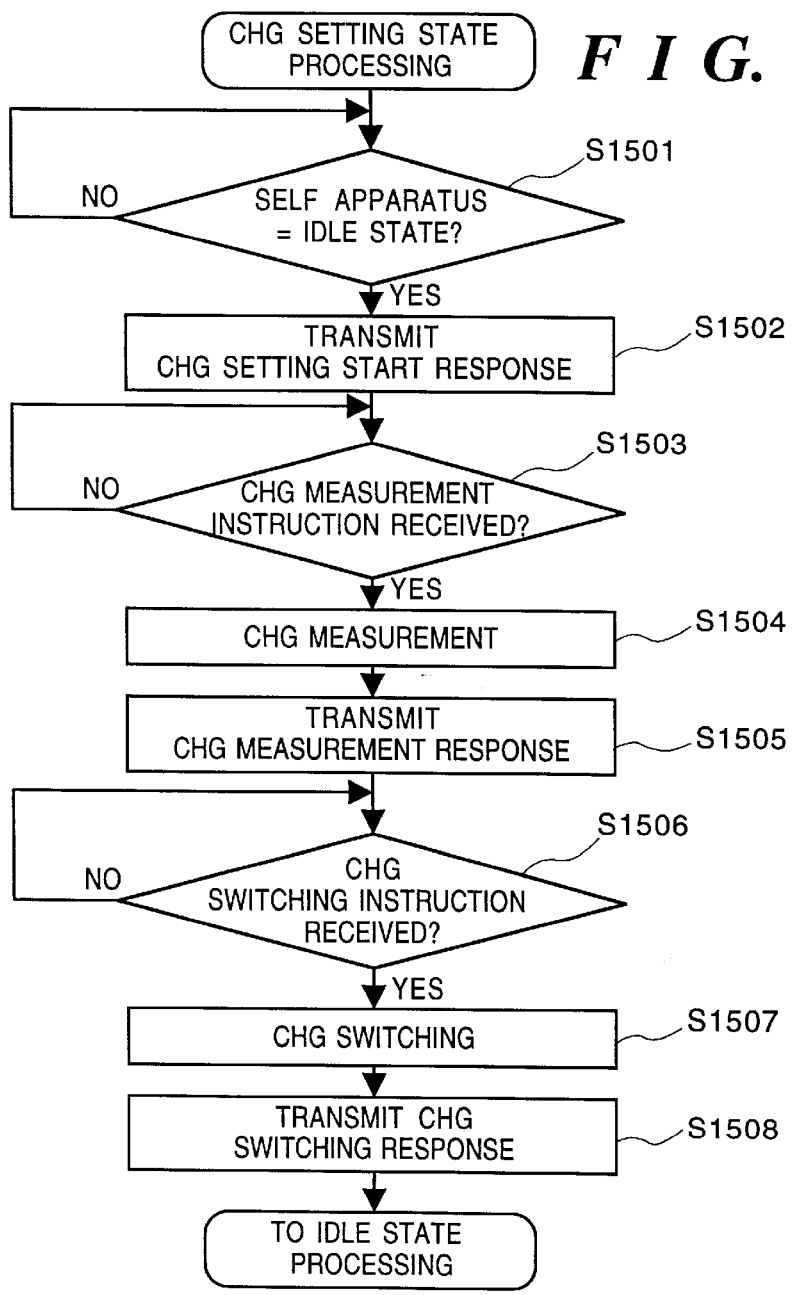

CHG : CHANNEL GROUP

SELECTING A RADIO CHANNEL FROM A GROUP OF RADIO CHANNELS WHERE AN INFLUENCE OF INTERMODULATION HAS BEEN CONSIDERED DURING SIMULTANEOUS COMMUNICATION WITH A PLURALITY OF RADIOS

BACKGROUND OF THE INVENTION

The present invention relates to a radio communication apparatus which performs a communication by selecting a radio channel to be used from a plurality of channel groups.

A conventional radio communication apparatus measures the carrier levels of a plurality of radio channels available, determines channels whose carrier levels are equal to or lower than a given reference value as idle channels, and selects an arbitrary one of the idle channels to perform a communication.

When a plurality of such radio communication apparatuses are used within an identical radio area, if a plurality of channels are simultaneously used, as shown in FIG. 2, intermodulation waves are generated. For this reason, if an idle channel is merely selected and used, the intermodulation may adversely influence channels in use. In order to eliminate the adverse influence due to the intermodulation, a channel in use which may cause intermodulation with other channels is calculated and stored as an invalid channel, and is excluded from channel candidates to be selected.

However, when a plurality of radio communication apparatuses are used within a single radio area, all the combinations of channels in use may cause intermodulation, and the number of intermodulation waves becomes huge.

Under such conditions, in the above mentioned method that takes intermodulation into consideration upon selection of a channel, intermodulation waves may be generated over a broad range depending on the combination of selected channels, and the number of channels that can be used may become extremely small.

SUMMARY OF THE INVENTION

It is an object of the present invention to provide a radio communication apparatus which is capable of performing a maximum possible number of radio communications within a single radio area.

It is another object of the present invention to provide a radio communication apparatus which can easily change the radio channels to be used even when the radio environment during the use of the apparatus considerably changes from that upon setting due to addition of a new radio communication apparatus or addition of equipments such as various OA equipments that may generate radio noise.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a flow chart showing the processing sequence in a key service unit in the fourth embodiment;

FIG. 14 is a flow chart showing the processing sequence in a base station in the fourth embodiment;

FIG. 15 is a flow chart showing the processing sequence in the base station in the fourth embodiment;

DESCRIPTION OF THE PREFERRED EMBODIMENTS

First Embodiment

The first embodiment of the present invention will e described hereinafter with reference to the accompanying drawings.

Figure 1:
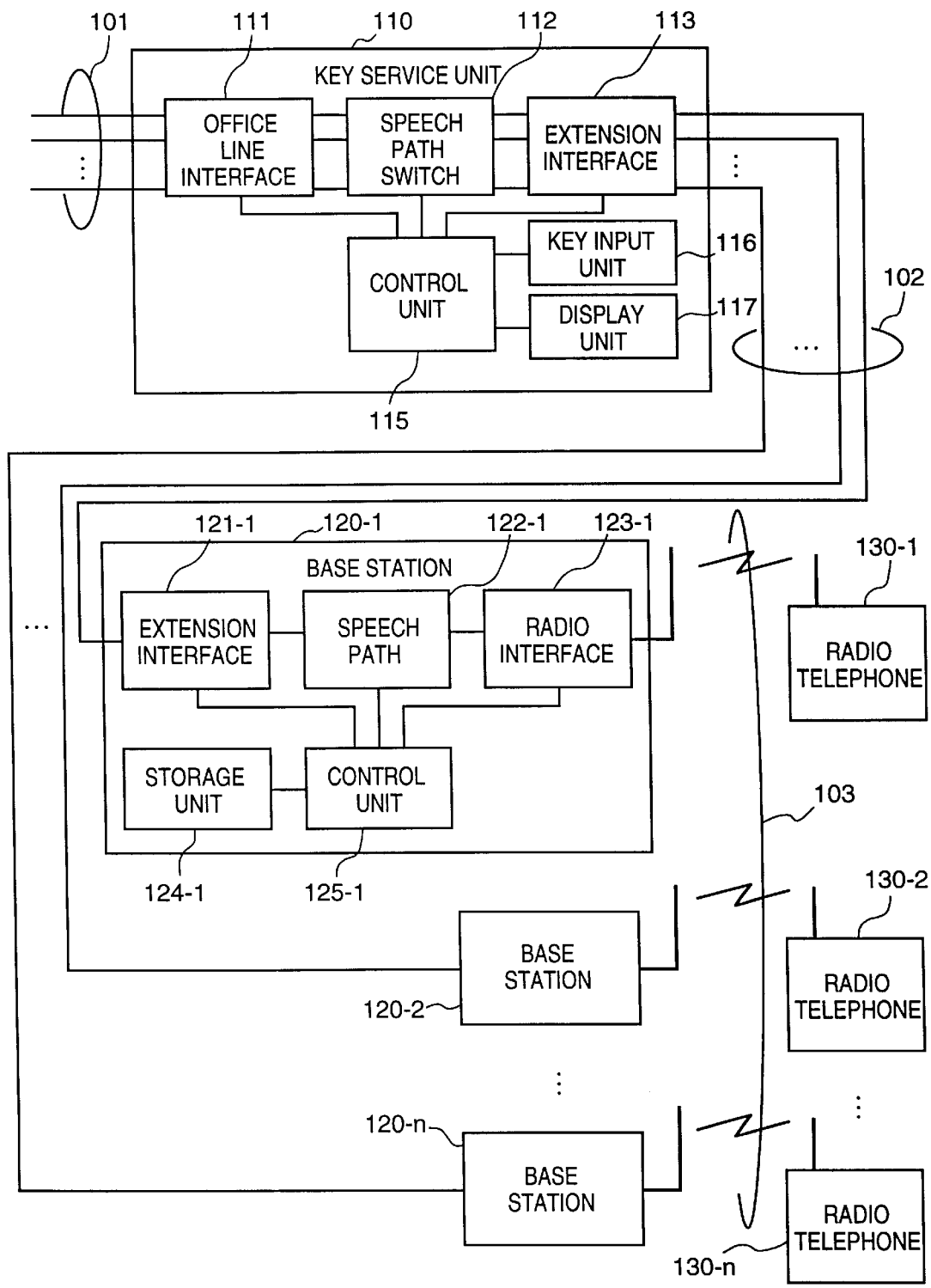
FIG. 1 is a block diagram of a wireless key telephone system according to the first embodiment of the present invention.

FIG. 1 is a block diagram of a wireless key telephone system according to an embodiment of the present invention.

Referring to FIG. 1, reference numeral 110 denotes a key service unit which performs exchange operations between office lines 101 and extensions 102 or between the extensions 102; 130-1 to 130-n, radio telephones; and 120-1 to 120-n, base stationes which are connected to the extensions 102 of the key service unit 110 via a radio line 103 to connect the radio telephones 130-1 to 130-n.

Reference numeral 111 denotes an office line interface for accommodating the office lines 101; 112, a speech path switch for switching speech paths between the office lines 101 and the extensions 102 or between the extensions 102; 113, an extension interface for accommodating the extensions 102; 115, a control unit for controlling the key service unit 110; 116, a key input unit provided with keys for operating the key service unit 110, keys for inputting ID data, and the like; and 117, a display unit for displaying a setting screen upon setting channel groups to be described later.

Reference numeral 121-1 in the base station 120-1 denotes an extension interface for accommodating the extension 102; 122-1, a speech path for forming a speech path between the extension interface 121-1 and a radio interface 123-1; 123-1, a radio interface for interconverting a radio signal received at an antenna and a signal to be processed in the base station 120-1; 124-1, a storage unit for dividing channels into a plurality of groups each of which includes a maximum possible number of channels that do not interfere with each other due to intermodulation waves, and storing the plurality of channel groups and channel group ID data for identifying these groups; and 125-1, a control unit for controlling the base station 120-1.

The base stationes 120-2 to 120-n have the same arrangements as that of the base station 120-1.

Figure 2:
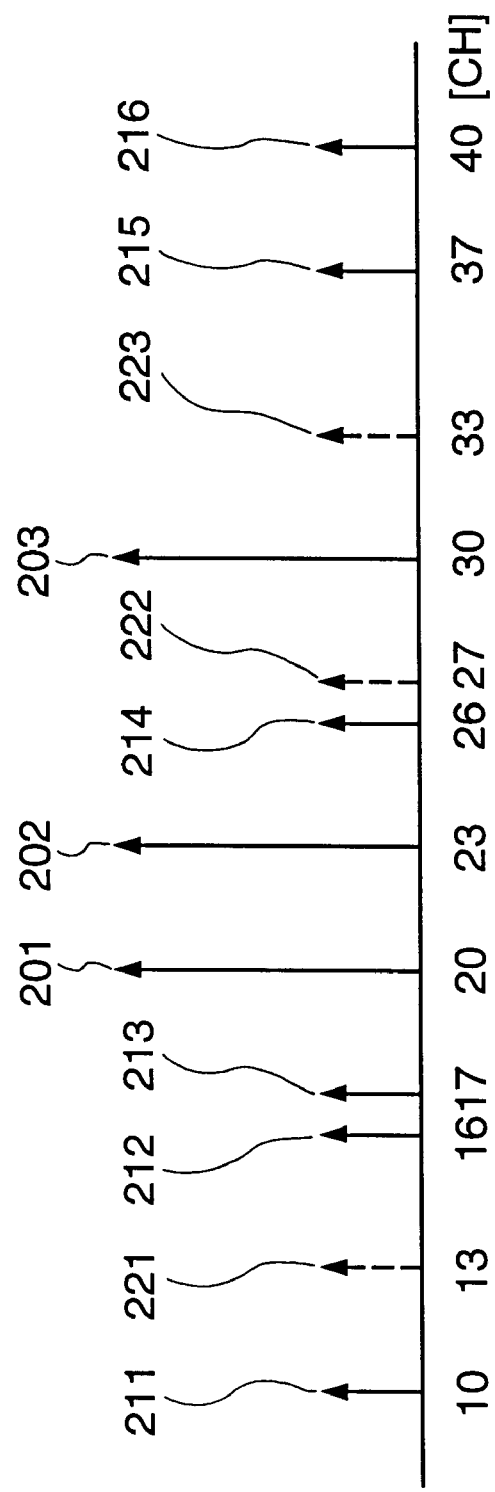
FIG. 2 is a chart showing an example of intermodulation waves.

FIG. 2 shows an example of intermodulation waves.

Referring to FIG. 2, reference numerals 201 to 203 denote channels in use; and 211 to 216 and 221 to 223, intermodulation waves.

As shown in FIG. 2, when, for example, three channels (20ch, 23ch, and 30ch) are in use, intermodulation waves 221 to 223 calculated from a formula x+y−z(x, y, z∈{20, 23, 30}, x≠y≠z) are generated as those due to three channels x, y, and z, and intermodulation waves 211 to 216 calculated from a formula 2x−y(x, y∈{20, 23, 30}, x≠y) are generated as those due to two channels x and y.

Figure 3:
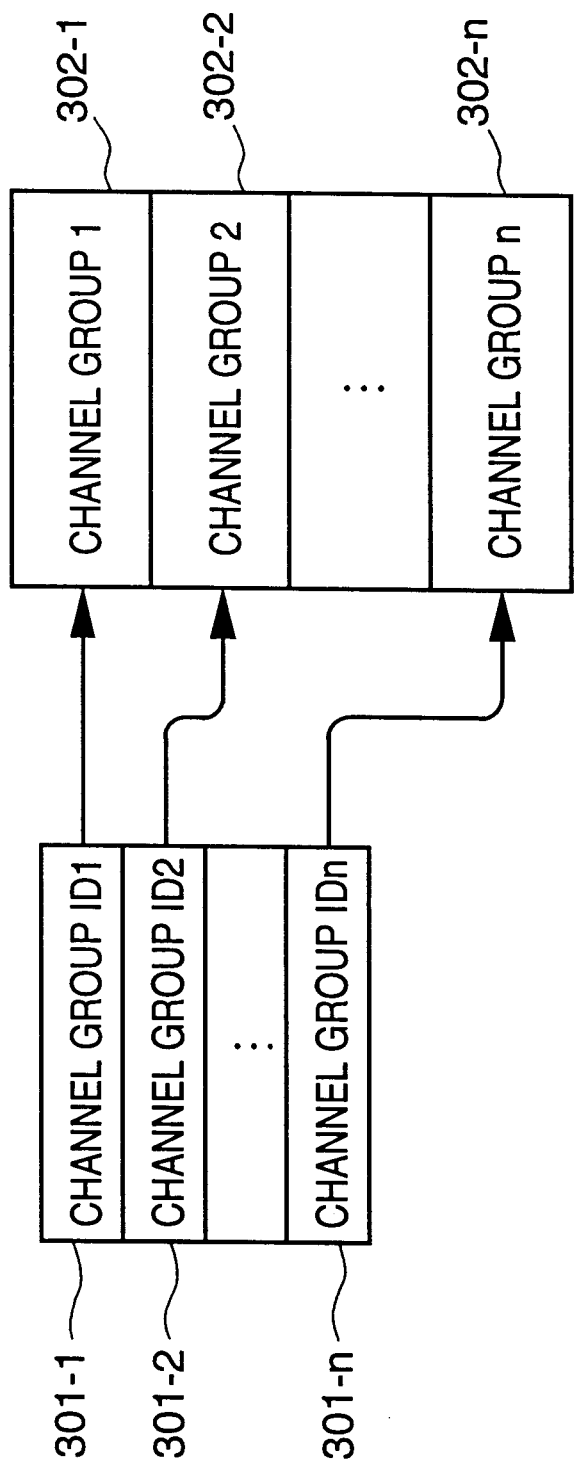
FIG. 3 is a view showing the data architecture of a channel group.

Groups of channels which do not interfere with each other due to these intermodulation waves and allow selection of a maximum possible number of channels are calculated, and a plurality of channel groups 302 1 to 302 n and channel group ID data 301 1 to 301 n for identifying these groups are stored in the storage unit 124-1 in the base station 120-1, as shown in FIG. 3. The channel groups and their ID data are similarly stored in other base stationes.

In this case, as the method of calculating the channel groups, for example, channels are combined so that generated intermodulation waves are superposed on each other, thereby decreasing the number of intermodulation waves.

The operation of the wireless key telephone system will be described below with reference to FIGS. 4 and 5.

Figure 4:
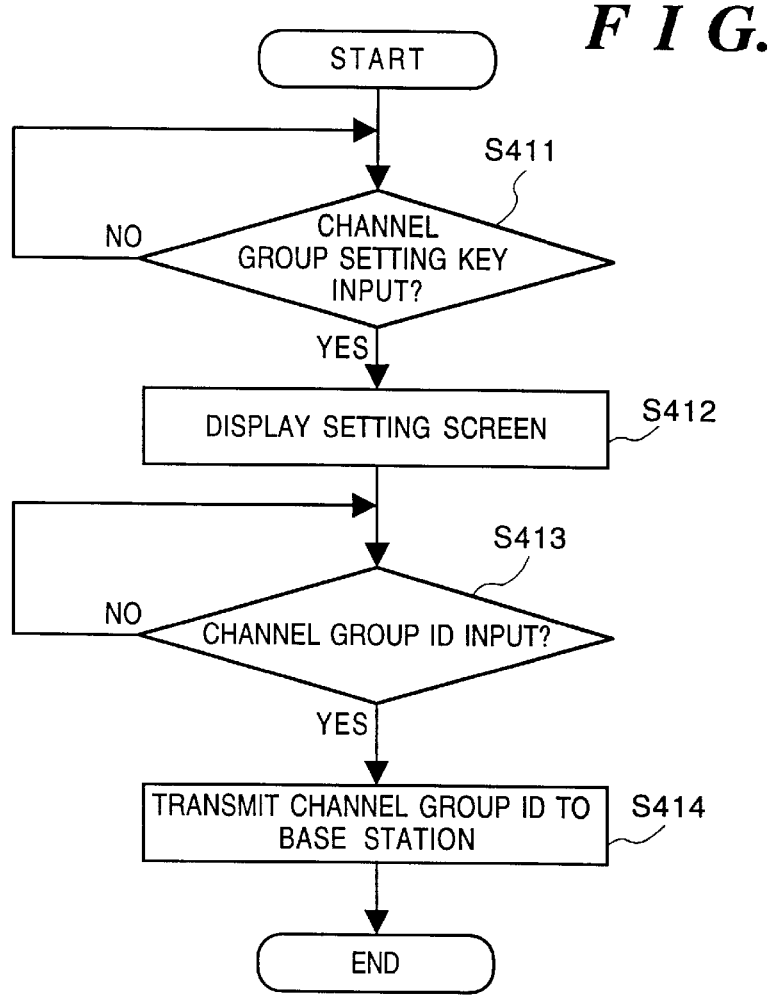
FIG. 4 is a flow chart showing the operation of a key service unit in the first embodiment.
Figure 5:
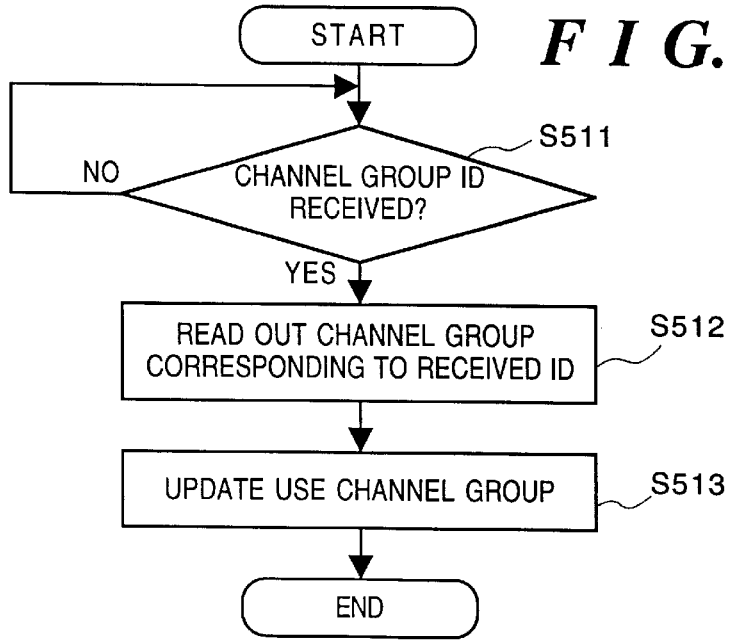
FIG. 5 is a flow chart showing the operation of a base station in the first embodiment.

FIG. 4 is a flow chart showing the operation of the key service unit 110, and FIG. 5 is a flow chart showing the operation of the base station 120. In this embodiment, the operation of the base station 120-1 will be described below.

Upon setting the system, a service person or an operator measures the radio environment of the setting place.

The radio environment is measured using a simple spectrum analyzer or the electric field strength measurement function of the base station.

The service person or operator selects a channel group free from the influence of noise and radio troubles of neighboring radio equipments on the basis of the measurement result of the radio environment.

At this time, if no channel group free from any radio troubles is available, a channel group suffering less radio troubles is selected.

Then, a channel group setting key is input from the key input unit 116 in the key service unit 110. When the key service unit control unit 115 detects the key input (S411), it displays the channel group setting screen on the display unit 117 (S412) to prompt the service person or operator to input channel group ID data. When the channel group ID data is input from the key input unit 116 (S413), the channel group ID data is transmitted to the base station 120-1 via the extension interfaces 113 and 121-1 (S414). In the base station 121-1, upon reception of the channel group ID data (S511), the control unit 125-1 reads out the corresponding channel group from the storage unit 124-1 (S512), and updates the readout channel group to be a use channel group. The channel group ID data is also transmitted to the base stationes 120-2 to 120-n, and the base stationes 120-2 to 120-n update the same channel group as a use channel group.

With this processing, the base station 120-1 selects an idle channel from the updated use channel group, and connects a radio line with the radio telephone 130-1. Similarly, even when all the telephones 130-1 to 130-n simultaneously use channels, they can select channels from a common use channel group, all the telephones can reliably select channels that do not interfere with each other.

In the above description, the channel group setting operation is performed using the key input unit 116 and the display unit 117 in the key service unit 110. Alternatively, when a key input unit and a display unit are arranged in the base station, the same effect as described above can be expected.

Second Embodiment

In the first embodiment, the channel groups are stored in the storage units of the respective base stationes. However, in this embodiment, the key service unit 110 comprises a storage unit 114 for storing channel groups, as shown in FIG. 6.

Figure 6:
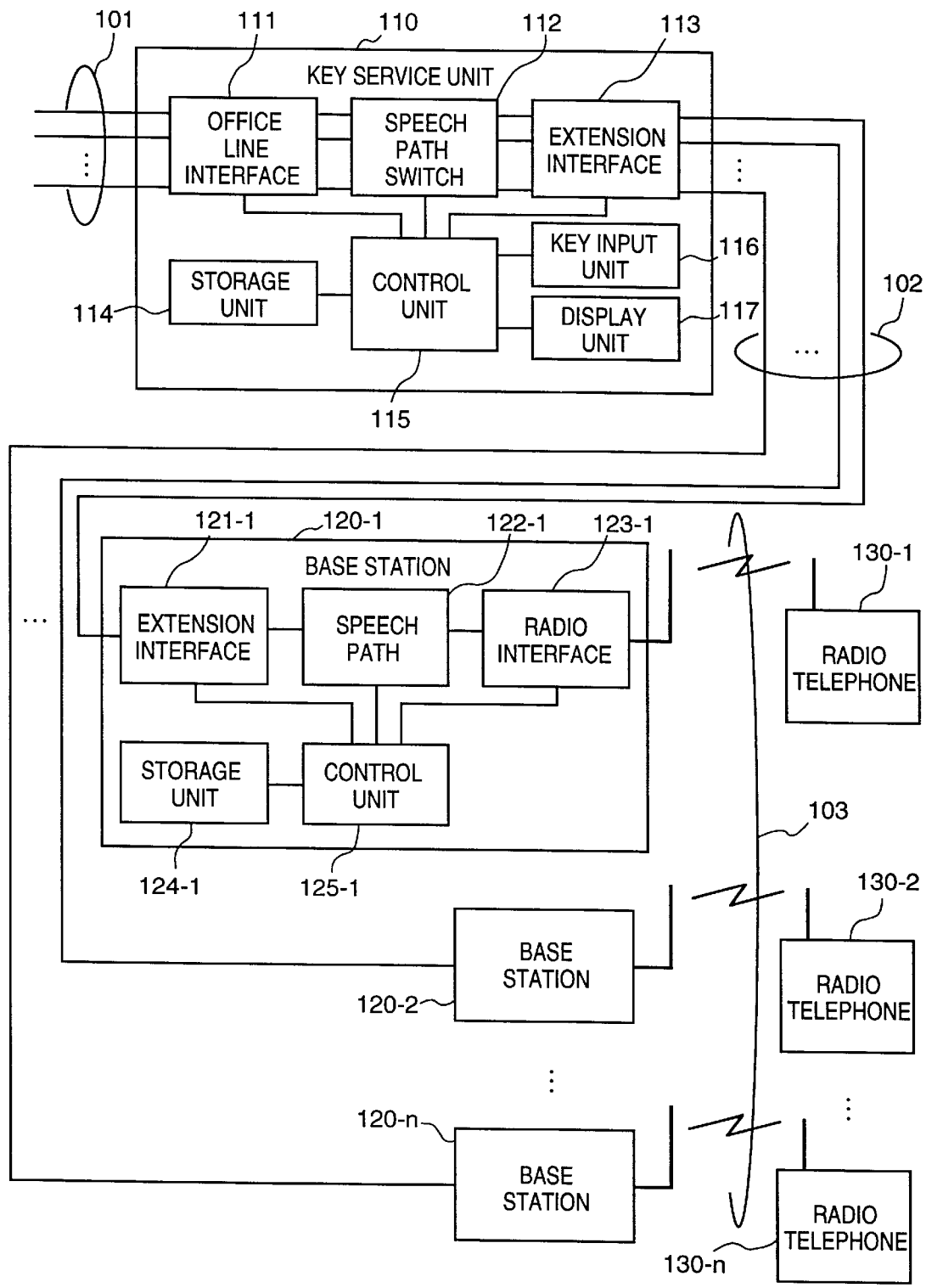
FIG. 6 is a block diagram of a wireless key telephone system according to the second embodiment of the present invention.

Referring to FIG. 6, reference numeral 114 denotes a storage unit for dividing channels into a plurality of groups each of which includes a maximum possible number of channels that do not interfere with each other due to intermodulation waves, and storing the plurality of channel groups and channel group ID data for identifying these groups, as shown in FIG. 3.

Since other arrangements are the same as those in FIG. 1, a detailed description thereof will be omitted.

The operation of the wireless key telephone system will be described below with reference to FIGS. 7 and 8.

Figure 7:
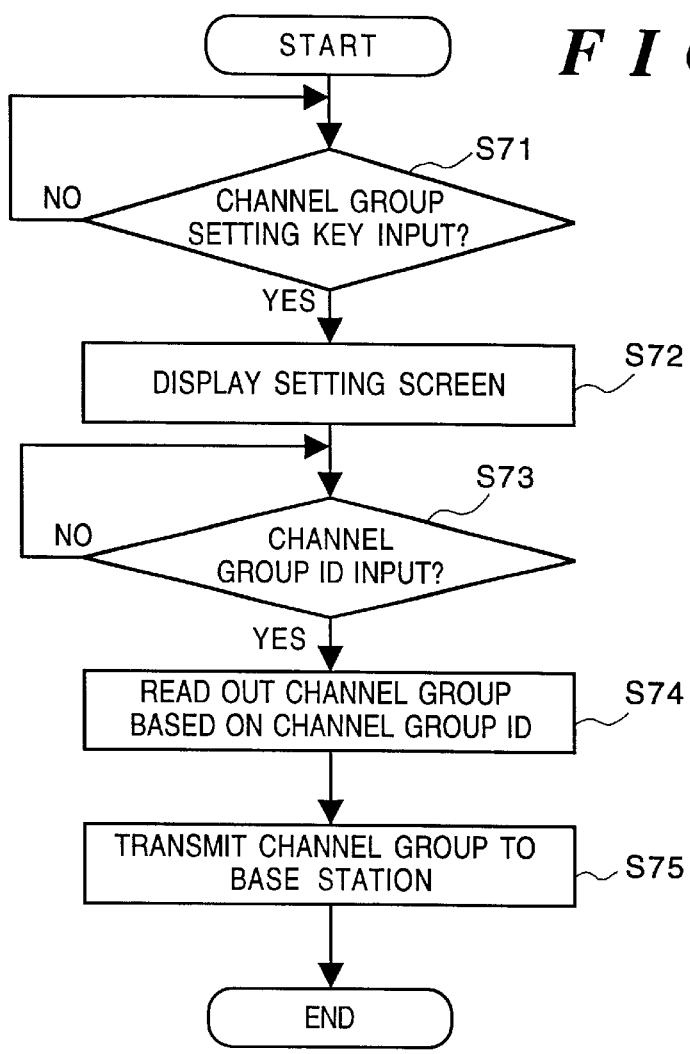
FIG. 7 is a flow chart showing the operation of a key service unit in the second embodiment.
Figure 8:
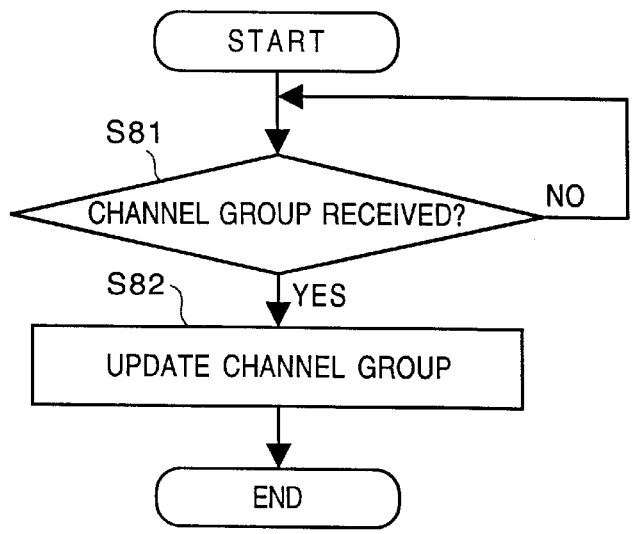
FIG. 8 is a flow chart showing the operation of a base station in the second embodiment.

FIG. 7 is a flow chart showing the operation of the key service unit 110, and FIG. 8 is a flow chart showing the operation of the base station 120.

As in the first embodiment, upon setting the system, a service person or an operator measures the radio environment of the setting place. The service person or operator selects a channel group free from or suffering less the influence of noise and radio troubles of neighboring radio equipments on the basis of the measurement result of the radio environment. Then, the service person or operator inputs a channel group setting key on the key input unit 116 in the key service unit 110. When the key service unit control unit 115 detects the key input (S71), it displays the channel group setting screen on the display unit 117 (S72) to prompt the service person or operator to input channel group ID data.

When the channel group ID data is input from the key input unit 116 (S73), a channel group corresponding to the input channel group ID data is read out from the storage unit 114 (S74), and channels in the readout channel group are transmitted to the base stationes 120-1 to 120-n as a use channel group (S75).

Upon reception of the channel group transmitted from the key service unit 110 (S81), the base stationes 120-1 to 120-n store the received channel group in the storage units 124-1 to 124-n, thus updating the channel group (S82).

With this processing, since all the channel groups need not be stored in the storage units of the base stationes, the storage capacity can be reduced.

Third Embodiment

In the first and second embodiments, a plurality of channel groups are stored in the storage unit or units. However, in this embodiment, only one group of channels free from intermodulation is stored.

Figure 9:
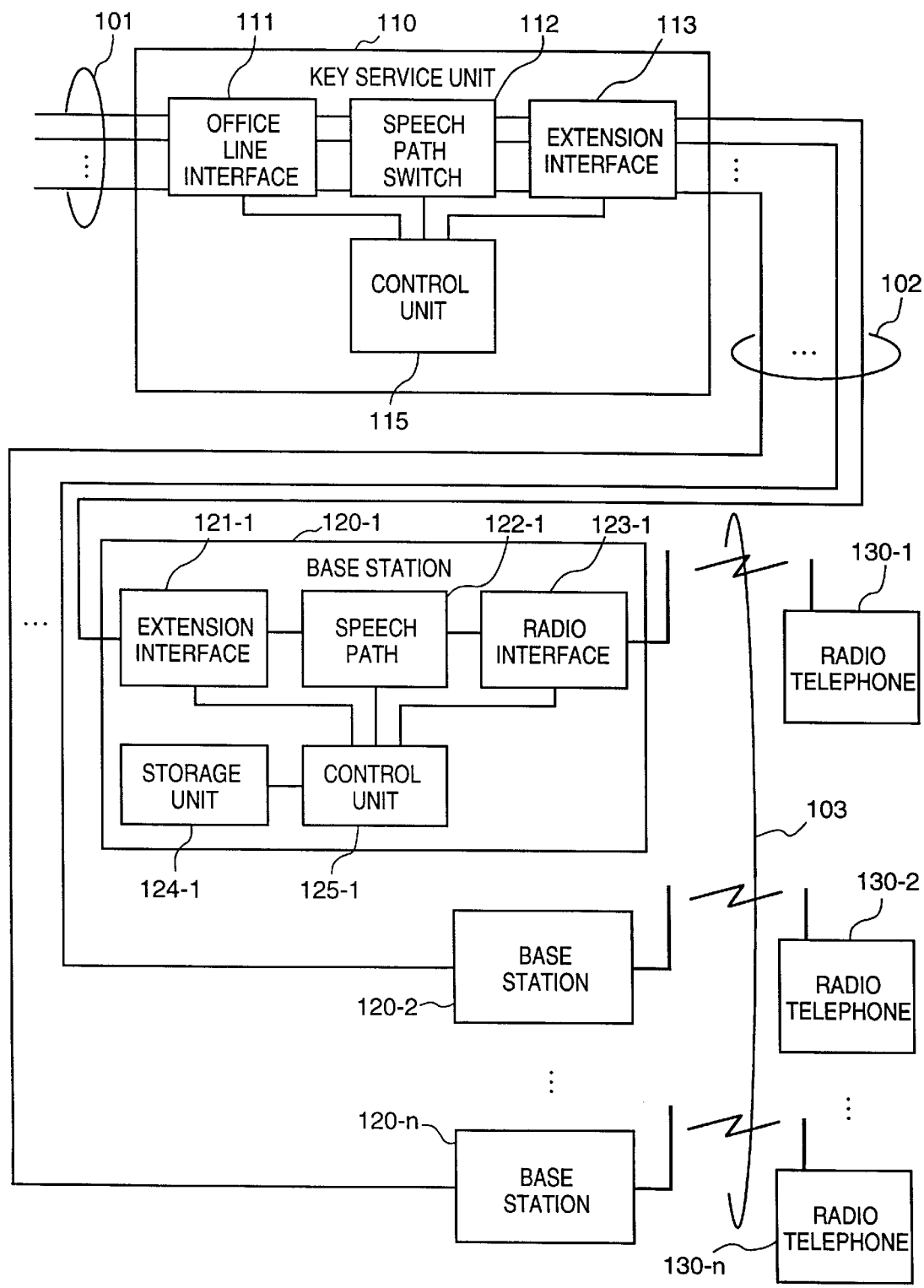
FIG. 9 is a block diagram of a wireless key telephone system according to the third embodiment of the present invention.

FIG. 9 is a block diagram showing the arrangement of the system of this embodiment.

In FIG. 9, the key input unit 116 and the display unit 117 in the key service unit 110 shown in FIG. 1 are omitted, and the storage unit 124-1 of the base station 120-1 stores only channels free from intermodulation.

With this arrangement, although a channel group cannot be selected in correspondence with the radio environment, channels are never influenced by intermodulation waves.

Fourth Embodiment

The fourth embodiment of the present invention will be described in detail below with reference to the accompanying drawings.

Figure 10:
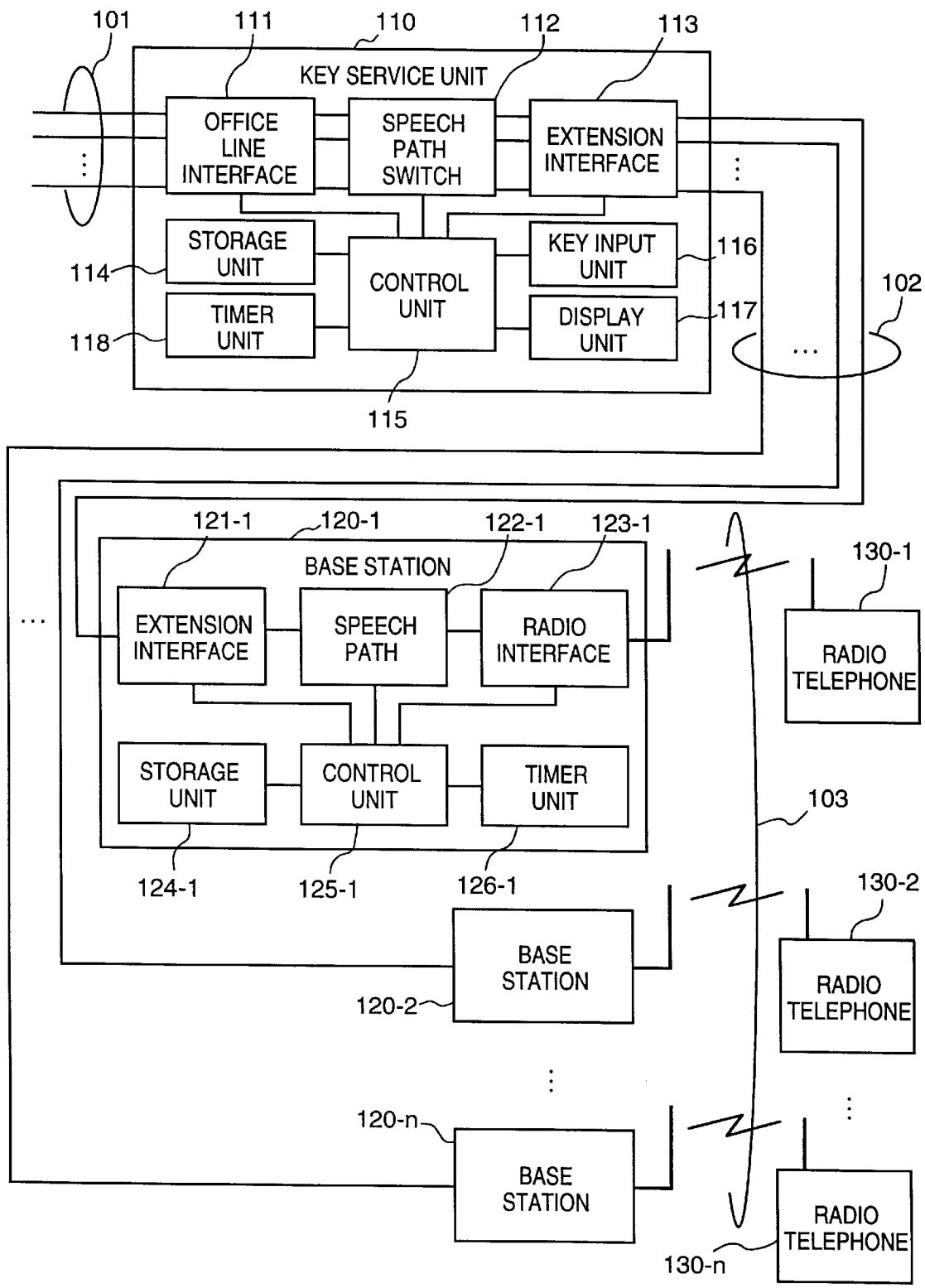
FIG. 10 is a block diagram of a wireless key telephone system according to the fourth embodiment of the present invention.

FIG. 10 is a block diagram showing the arrangement of a wireless key telephone system (to be simply referred to as a system hereinafter) according to the fourth embodiment of the present invention. Referring to FIG. 10, reference numeral 110 denotes a key service unit for controlling the entire system; and 120-1 to 120-n, base stationes for connecting radio telephones 130-1 to 130-n to the key service unit 110 via a radio line 103. Reference numeral 101 denotes office lines (outer lines) such as public lines or dedicated lines; 102, extensions which physically connect the key service unit 110 and the base stationes 120-1 to 120-n and have plug jack type cords or connectors; and 103, a radio line including a plurality of speech communication channels as in a radio line used for a low power cordless telephone in Japan or the like.

In the key service unit 110, reference numeral 111 denotes an office line interface for realizing various interface functions such as incoming call detection, call originating control, and the like with the office lines 101; 112, a speech path switch; and 113, an extension interface for transmitting/receiving audio information and various kinds of control information between extension terminals such as the above mentioned base stationes. Reference numeral 114 denotes a storage unit such as a RAM, a hard disk, an EEPROM, or the like in/from which various kinds of information can be written/read out; 116, a key input unit which comprises a keyboard, dial keys, programmable keys, special function keys, and the like, and is used for performing various key input operations; 117, a display unit which comprises one of various types of displays such as a CRT, LCD, or the like, or an LED; 118, a timer unit which comprises, e.g., a software timer, and measures a predetermined time period; and 115, a control unit for controlling the respective units in the key service unit 110.

FIG. 10 illustrates the internal arrangement of only the base station 120-1, but other base stationes 120-2 to 120-n have the same arrangement as that of the base station 120-1.

In the base station 120-1, reference numeral 121-1 denotes an extension interface for exchanging audio information and various control signals with the key service unit 110; 122-1, a speech path having a function of an audio processing system; 123-1, a radio interface for exchanging an audio signal and various control signals with the radio telephone 130-1; 124-1, a storage unit which comprises, e.g., a RAM, an EEPROM, or the like, divides channels into a plurality of groups each of which includes a maximum possible number of channels that do not interfere with each other due to intermodulation waves, and stores the plurality of channel groups and channel group ID data for identifying these groups, as shown in FIG. 3; 126 1, a timer unit comprising, e.g., a software timer; and 125-1, a control unit for controlling the respective units in the base station 120-1. The control unit 125-1 measures the carrier level using the radio interface 123-1.

The operation of the system of this embodiment will be described in detail below.

Figure 11:
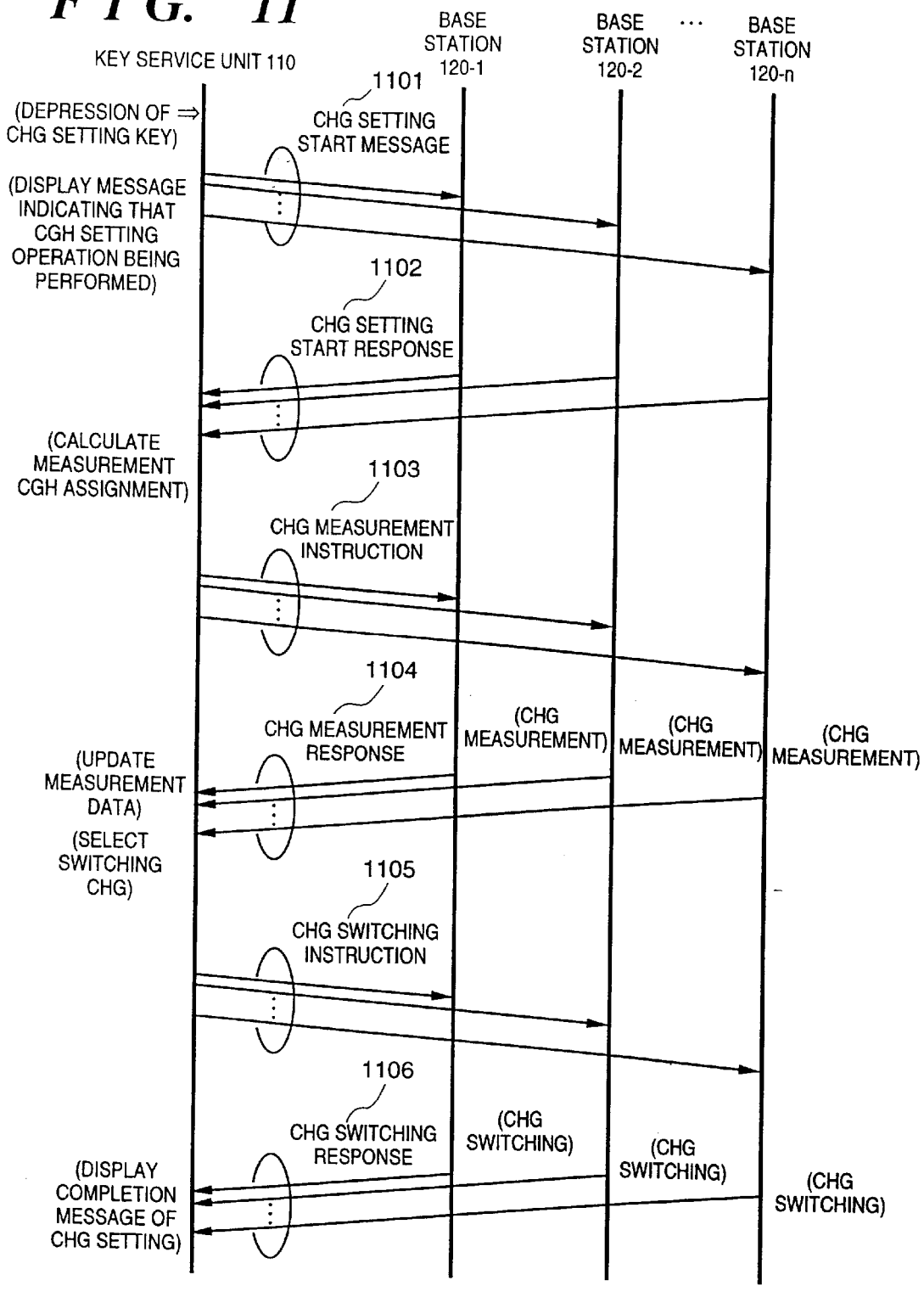
FIG. 11 is a chart showing the operation sequence in the system in the fourth embodiment.
Figure 13:
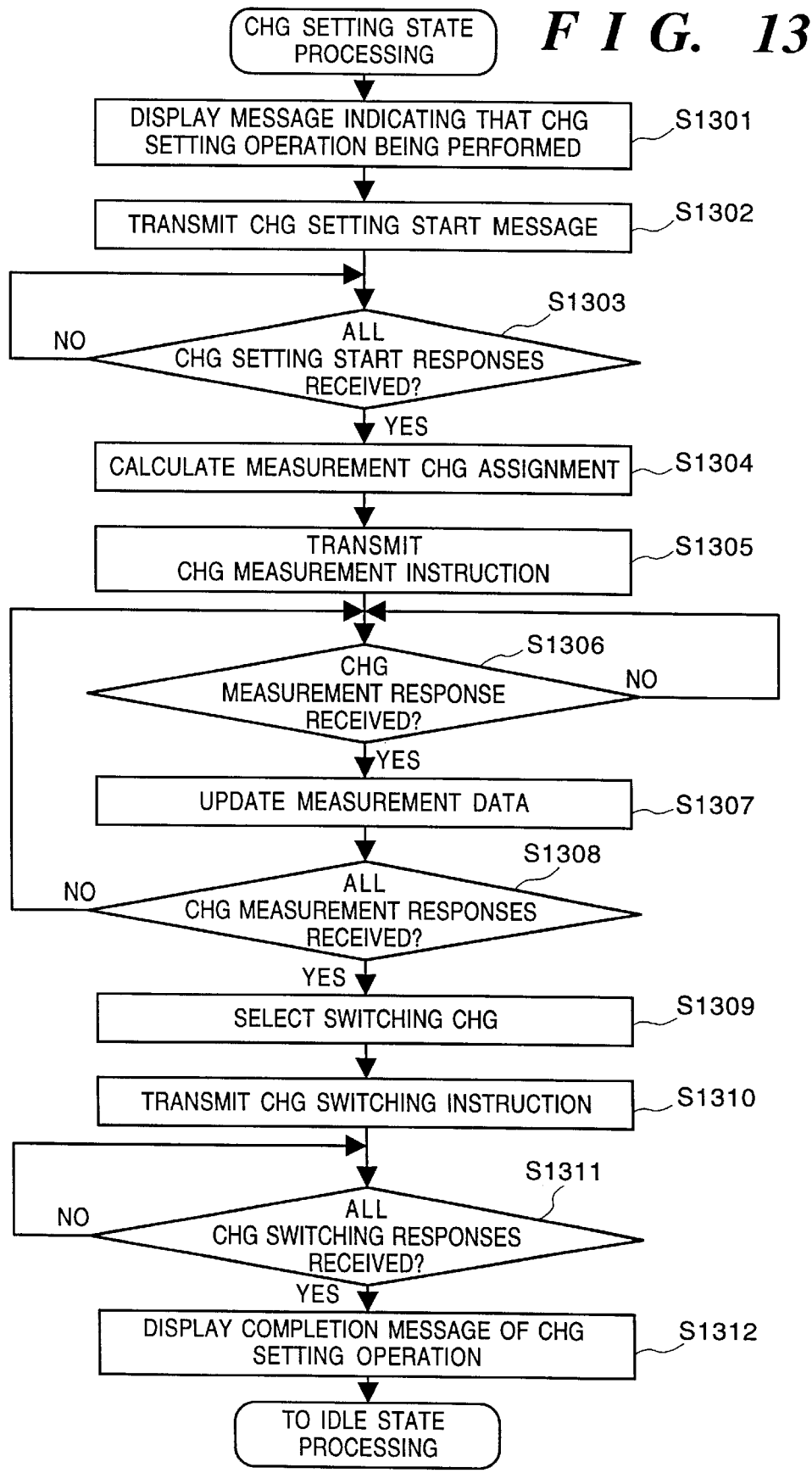
FIG. 13 is a flow chart showing the processing sequence in the key service unit in the fourth embodiment.

FIG. 11 shows the operation sequence of the system of this embodiment, FIGS. 12 and 13 are flow charts showing the processing sequence in the key service unit, and FIGS. 14 and 15 are flow charts showing the processing sequence in the base station.

Upon setting of the wireless key telephone system of this embodiment or upon detection of steady state noise in the currently used radio line, when the control unit 115 of the key service unit 110 detects the input operation of a channel group (to be abbreviated as CHG in FIG. 11) setting key upon operation of a special button or a special number button (not shown) set on the key input unit 116 in the key service unit 110 (YES in step S1201), it starts channel group setting state processing shown in FIG. 13.

Upon reception of the channel group setting key input, the key service unit 110 displays a message indicating the start of the channel group setting operation on the display unit 117 such as an LCD or the like (step S1301 in FIG. 13), and transmits a channel group setting start message (see 1101 in FIG. 11) to the base stationes 120-1 to 120-n via the extension interface 113 (step S1302).

Upon reception of the channel group setting start message 1101 from the key service unit 110 via the extension interface 121-1 (YES in step S1401 in FIG. 14), the control unit 125-1 in the base station 120-1 starts channel group setting state processing shown in FIG. 15. Then, the control waits until the apparatus itself is set in an idle state (step S1501). If YES in step S1501, a channel group setting start response 1102 is transmitted to the key service unit 110 via the extension interface 121-1 (step S1502).

Communications of control information between the key service unit and the base station are made via the extension interface, and a detailed description thereof will be omitted.

Upon reception of channel group setting start responses 1102 (see FIG. 11) from all the base stationes 120-1 to 120-n (step S1303 in FIG. 13), the control unit 115 in the key service unit 110 assigns channel groups to be respectively measured by the base stationes 120-1 to 120-n to them as measurement channel groups (step S1304). The control unit 115 adds measurement channel group information to a channel group measurement instruction 1103 as a parameter, and transmits the instruction to the base stationes (step S1305).

Upon reception of the channel group measurement instruction 1103 (YES in step S1503 in FIG. 15), the control unit 125 of each base station measures the carrier levels of channels in the assigned measurement channel group for a predetermined period of time (step S1504). The control unit 125 adds the average values of the carrier levels of the respective channels to a channel group measurement response 1104 as parameters, and transmits the response to the key service unit 110 (step S1505).

Each time the channel group measurement response 1104 is received (YES in step S1306), the key service unit 110 updates the measurement data stored in the storage unit 114 with the received data (step S1307). If the channel group measurement responses 1104 from all the base stationes 120-1 to 120-n are received (YES in step S1308), the channel of interest is determined as a busy channel if the average value of the carrier level values of the channel is larger than a reference value A. If the channel group which is currently used does not include any busy channel, the use of the channel group is continued; if the channel group which is currently used includes a busy channel or channels, another channel group including no busy channel is selected. on the other hand, if no channel group exempt from busy channels is available, a channel group including the smallest number of busy channels is selected (step S1309). The channel group ID data of the selected channel group is added to a channel group switching instruction 1105, and the instruction is transmitted to the base stationes 120-1 to 120-n (step S1310).

Upon reception of the channel group switching instruction 1105 (step S1506), the base stationes 120-1 to 120-n select and update the channel group corresponding to the received channel group ID data from those stored in their storage unit 124-1 to 124-n (step S1507). Each base station transmits a channel group switching response 1106 to the key service unit 110 (step S1508), and returns to idle state processing. If the channel group need not be switched, a message indicating this is sent using a parameter.

Upon reception of the channel group switching responses 1106 from all the base stationes 120-1 to 120-n (YES in step S1311), the key service unit 110 displays a message indicating the end of the channel setting operation on the display unit 117 (step S1312), thus completing the channel group switching operation.

As described above, according to this embodiment, a switching channel group, which is optimal for the radio environment of the base stationes, is selected on the basis of information obtained by measuring the carrier levels of the channels to be used in radio communications, and the control is made to switch the current channel group to the selected channel group. In this manner, even when the radio environment changes, an optimal channel group can be easily selected.

Fifth Embodiment

Since the system arrangement used in this embodiment is the same as that in the fourth embodiment, a detailed description thereof will be omitted.

In this embodiment, the channel group selection processing (step S1309 in FIG. 13) is different from that in the fourth embodiment, and other processing operations are the same as those in the fourth embodiment.

In the operation of the base stationes 120-1 to 120-n, the average values and maximum values of the carrier levels of the channels are added as parameters to the channel group measurement response 1104, and the response is transmitted to the key service unit 110. Other processing operations are the same as those in the fourth embodiment.

Prior to the description of this embodiment, a channel which has a carrier level average value of larger than a reference value A is assumed to be a busy channel, a channel which has a carrier level maximum value larger than a reference value B (the reference value A<the reference value B) is assumed to be a channel used by another system (to be referred to as an interference channel hereinafter), and a channel which is a busy channel but is not an interference channel is assumed to be a noise channel.

Figure 16:
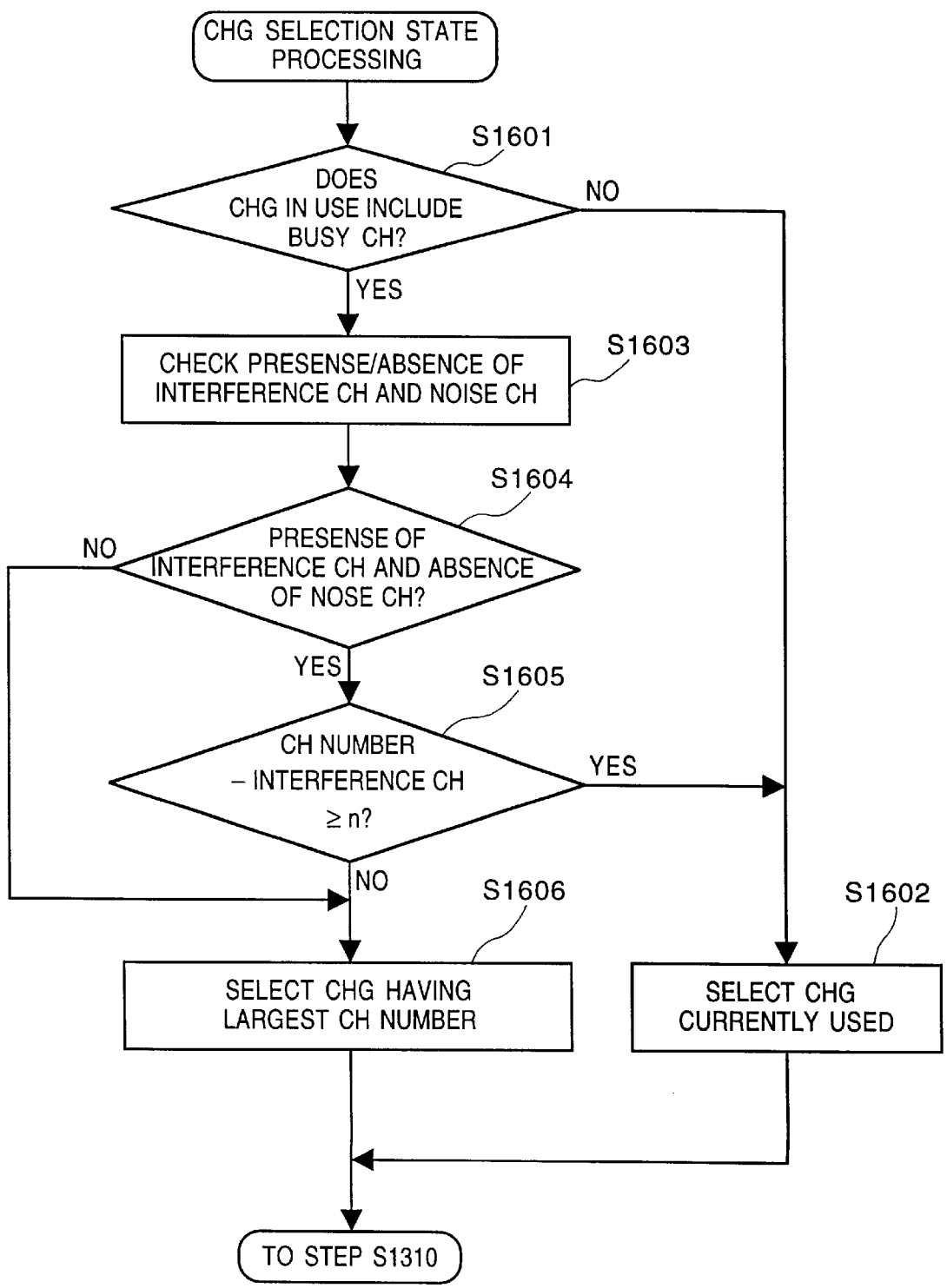
FIG. 16 is a flow chart showing channel group selection processing according to the fifth embodiment of the present invention.

FIG. 16 shows the channel group selection processing (step S1309 in FIG. 13) of this embodiment.

Referring to FIG. 16, the control unit 115 of the key service unit 110 determines a busy channel if the average value of the carrier level values informed from each base station 120 is larger than the reference value A, and checks if the channel group which is currently used includes a busy channel (step S1601). If NO in step S1601, the use of the channel group which is currently used is continued (step S1602). On the other hand, if YES in step S1601, the presence/absence of an interference channel and a noise channel in the channel group which is currently used is checked (step S1603).

As a result of checking in step S1603, if it is determined that the channel group which is currently used includes an interference channel but does not include any noise channel (step S1604), it is checked if the number of channels obtained by subtracting the number of interference channels from the number of channels of the channel group which is currently used is larger than the number (n) of base stationes 120 accommodated in the key service unit 110 (step S1605). If YES in step S1605, the use of the channel group is continued (step S1602); otherwise, another channel group which includes many interference channels but the smallest number of noise channels is selected from all the channel groups (step S1606).

According to this embodiment, since a channel group is selected in consideration of channels which are assumed to be used by other systems, intermodulation with other systems can be avoided.

If the number of channels obtained by subtracting the number of interference channels and the number of noise channels included in the channel group selected in step S1606 in FIG. 16 from the number of channels of the channel group is smaller than the number (n) of base stationes accommodated in the system, since all the base stationes cannot simultaneously make communications, an error display may be performed on the display unit 117.

Sixth Embodiment

The sixth embodiment of the present invention will be described below. Note that the arrangement of the wireless key telephone system according to this embodiment is the same as that shown in FIG. 10, and a detailed description and illustration thereof will be omitted.

Figure 17:
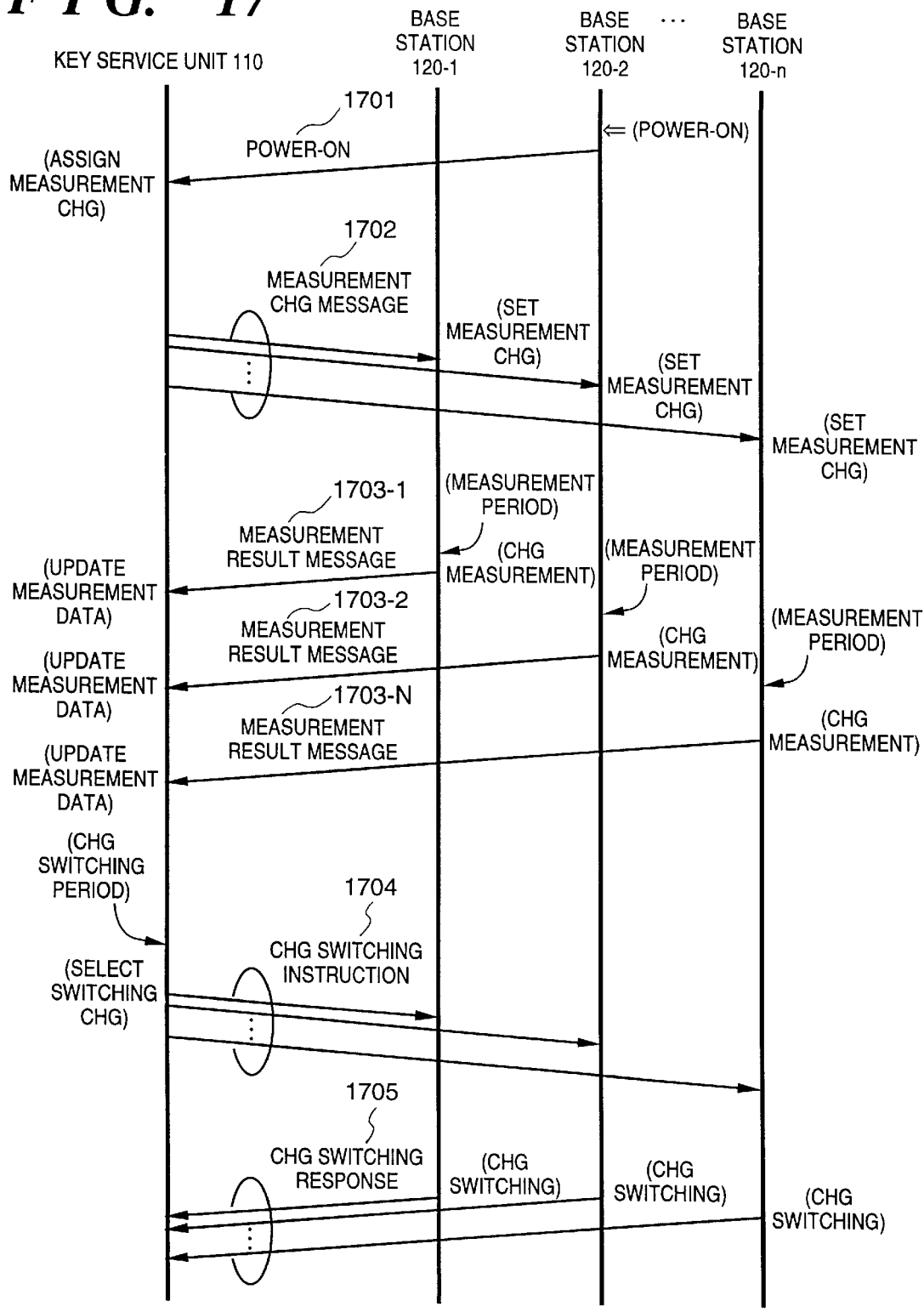
FIG. 17 is a chart showing the operation sequence in a system according to the sixth embodiment of the present invention.
Figure 18:
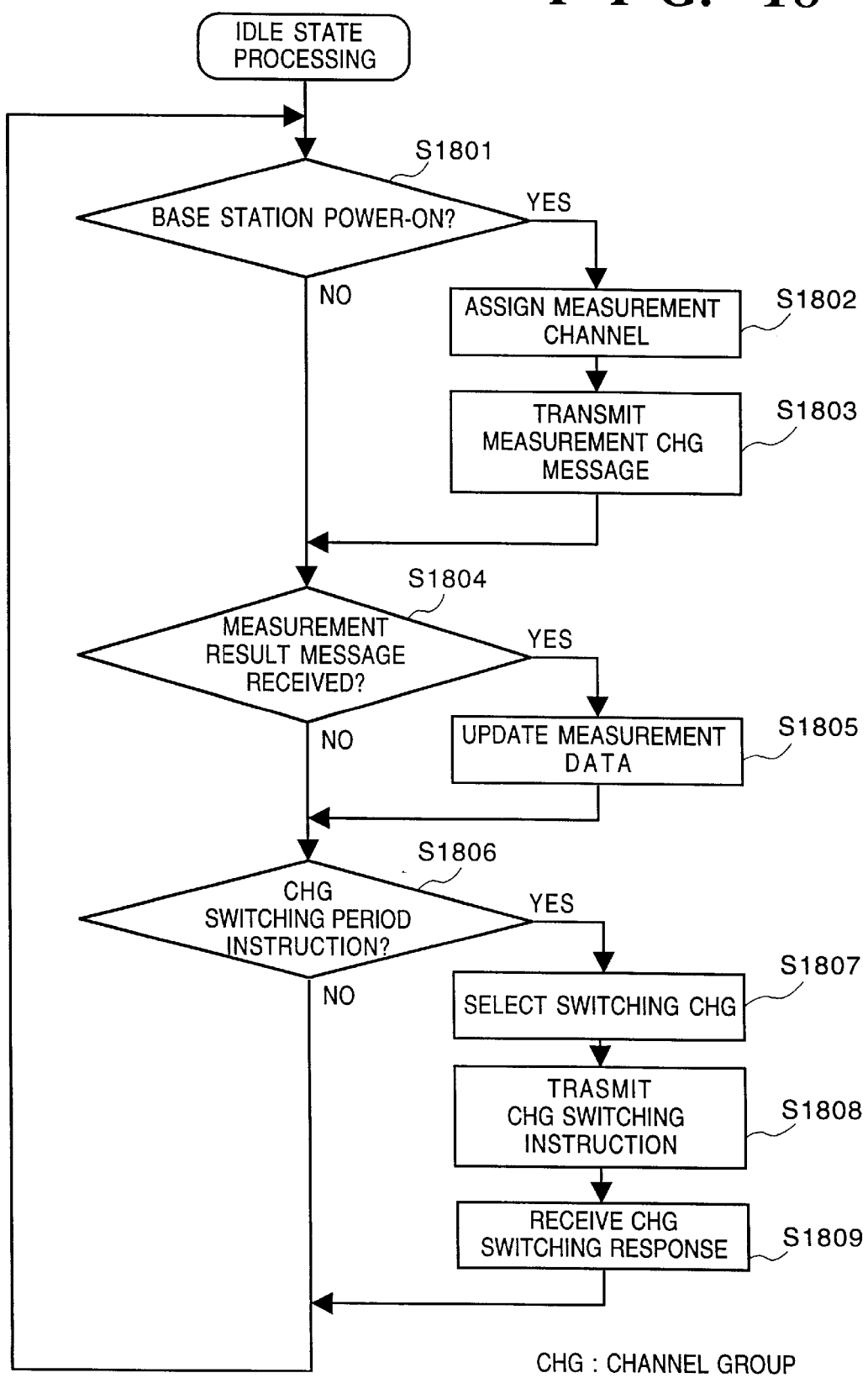
FIG. 18 is a flow chart showing the processing sequence in a key service unit in the sixth embodiment.
Figure 19:
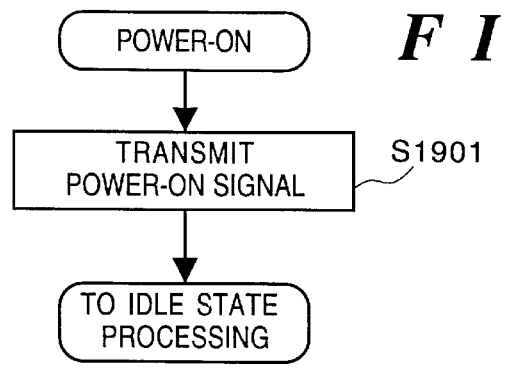
FIG. 19 is a flow chart showing the processing sequence in a base station in the sixth embodiment.
Figure 20:
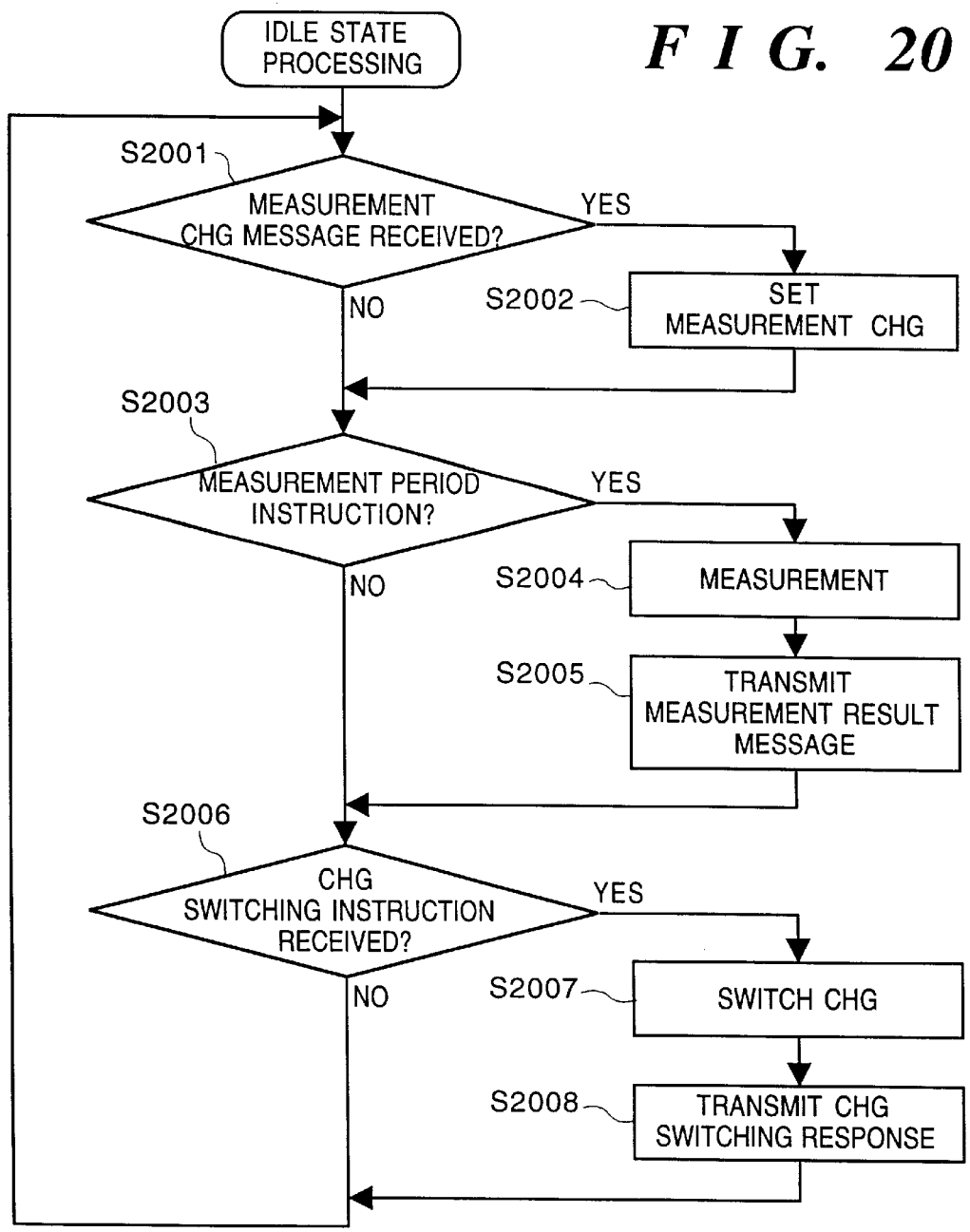
FIG. 20 is a flow chart showing the processing sequence in the base station in the sixth embodiment.

FIG. 17 shows the operation sequence of the system according to this embodiment, FIG. 18 is a flow chart showing the operation sequence of the key service unit, and FIGS. 19 and 20 are flow charts showing the operation sequence of the base station.

Initially, when the power switch of the base station is turned on, the base station transmits a power ON signal 1701 (see FIG. 17) to the key service unit 110 (step S1901 in FIG. 19), and starts idle state processing. On the other hand, upon reception of the power ON signal 1701 from the base station 120 (YES in step S1801), the key service unit 110 assigns channel groups for measuring the carrier levels to all the ON base stationes as measurement channel groups (step S1802), adds assigned measurement channel group information to a measurement channel group message 1702 as a parameter, and transmits the message 1702 to the base stationes (step S1803).

Upon reception of the measurement channel group message 1702 (YES in step S2001 in FIG. 20), the base station 120 changes the channel group stored in its storage unit 124 to the measurement channel group designated by the parameter (step S2002). For example, in the base station 120-1, when the timer unit 126 1 has measured a predetermined period of time, the start of measurement of channels is instructed (YES in step S2003), and the carrier levels of the channels in the measurement channel group are measured for a predetermined period of time (step S2004). The average value of the carrier level values is calculated from the measurement results, and is added to a measurement result message 1703 1 as a parameter. Then, the message 1703 1 is transmitted (step S2005).

Upon reception of the measurement result message 1703 1 (YES in step S1804), the key service unit 110 updates measurement data stored in the storage unit 114 (step S1805). In the key service unit 110, when the timer unit 118 instructs a channel group switching period (YES in step S1806), a switching channel group is selected on the basis of the measurement data by the same method as in the fourth embodiment (step S1807), and the switching channel group information is added as a parameter to a channel group switching instruction 1704. The instruction 1704 is transmitted to the respective base stationes 120 (step S1808).

Upon reception of the channel group switching instruction 1704 (YES in step S2006), each base station 120 switches the current channel group to the switching channel group designated by the key service unit 110 (step S2007), and transmits a channel group switching response 1705 to the key service unit 110 (step S2008).

The key service unit 110 receives this channel group switching response 1705 (step S1809) and completes the channel group switching operation.

Note that the measurement period and the channel group switching period are instructed when the corresponding base station and the wireless key telephone system are respectively set in an idle state.

According to this embodiment, the base station measures the carrier levels of the channel group designated by the key service unit upon power ON or periodically, and the key service unit instructs the channel switching operation to the base station on the basis of the measurement result. With this processing, the radio environment can be flexibly coped with the change.

In this embodiment, the channel group selection processing is attained by the same method as in the fourth embodiment. Alternatively, a channel group may be selected by the same method as in the fifth embodiment (i.e., a channel group is selected in consideration of channels which are assumed to be used by other systems).

Like in the third embodiment, channel groups may be stored in the storage unit in the key service unit, and channels of the selected channel group may be informed to the base stationes.

In the fourth, fifth, and sixth embodiments, the average values and maximum values of the carrier level values are calculated by each base station. Alternatively, the measurement results of each base station may be directly informed to the key service unit, and the key service unit may calculate the average values and the maximum values of the carrier levels.

In the sixth embodiment, the switching period of the channel group and the measurement period of carrier levels are determined by the time periods measured by the timer units in the key service unit and the base station. Alternatively, the switching period of the channel group and the measurement period of carrier levels may be determined by the time measured by either one of the timer units in the key service unit and the base station.

Note that the present invention may be applied to a case wherein the invention is attained by supplying a program to a system or an apparatus, needless to say. In this case, a storage medium that stores a program according to the present invention becomes one of the constituting elements of a system. By reading out the program from the storage medium to the system or apparatus, the system or apparatus operates in a predetermined way.

As described above, according to the present invention, since channels free from the influence of intermodulation are stored as a plurality of channel groups, and one, free from the adverse influences of noise and radio communications of other radio communication equipments, of the channel groups is selected. Therefore, channels can be used in correspondence with the setting place of the radio communication system.

Also, according to the present invention, since the channel group is controlled to be selected and switched on the basis of the measurement results of the carrier levels started in accordance with a predetermined instruction, an optimal channel group can be easily selected even when the radio environment or the like changes.

As many apparently widely different embodiments of the present invention can be made without departing from the spirit and scope thereof, it is to be understood that the invention is not limited to the specific embodiments thereof except as defined in the appended claims.

What is claimed is:

1. A radio communication apparatus comprising:

storage means for storing at least one group including a plurality of radio channels where an influence of intermodulation has been considered when the radio communication apparatus simultaneously performs communication with a plurality of radio communication apparatuses;

selection means for selecting a radio channel among the plurality of radio channels included in the group; and control means for controlling communication using the radio channel selected by said selection means.

2. The apparatus according to claim 1, further comprising group selection means for selecting one group from a plurality of groups, wherein said storage means stores the plurality of groups.

3. The apparatus according to claim 2, further comprising measurement means for measuring a carrier level of the radio channel, and wherein said group selection means selects the group on the basis of a measurement result of said measurement means.

4. The apparatus according to claim 3, further comprising instruction means for instructing the start of the measurement by said measurement means, and wherein said measurement means measures the carrier level in accordance with an instruction from said instruction means.

5. The apparatus according to claim 4, wherein said instruction means instructs the start of the measurement on the basis of an external operation.

6. The apparatus according to claim 4, wherein said instruction means instructs the start of measurement at predetermined time intervals.

7. The apparatus according to claim 3, wherein said group selection means selects the group on the basis of at least an average of the carrier levels within a predetermined period of time.

8. The apparatus according to claim 3, wherein said group selection means selects the group on the basis of at least a maximum value of the carrier levels within a predetermined period of time.

9. The apparatus according to claim 3, wherein said measurement means measures the carrier level when said radio communication apparatus is in an idle state.

10. The apparatus according to claim 1, wherein said storage means stores the group which combines a plurality of radio channels free from the influence of intermodulation among the plurality of radio channels used in each of the plurality of radio communication apparatuses.

11. A radio communication system having a plurality of radio communication apparatuses and a radio control apparatus, the system comprising storage means for storing at least one group including a plurality of radio channels where an influence of intermodulation has been considered when the radio communication apparatus simultaneously performs communication with a plurality of radio communication apparatuses, wherein said radio control apparatus comprises:
   allocating means for allocating a radio channel in the group to each of the plurality of radio communication apparatuses, and
said radio communication apparatus comprises:
   communication means for performing radio communication using the radio channel allocated by said allocating means.

12. The system according to claim 11, further comprising group selection means for selecting one group from a plurality of groups, wherein said storage means stores the plurality of groups and said allocating means allocates a radio channel in the group selected by said group selection means to each of the plurality of radio communication apparatuses.

13. The system according to claim 12, wherein said radio control apparatus comprises measurement means for measuring a carrier level of the radio channel, and
   said group selection means selects the group on the basis of a measurement result of said measurement means.

14. The system according to claim 13, wherein said radio control apparatus further comprises instruction means for instructing start of the measurement by said measurement means, and
   said measurement means measures the carrier level in accordance with an instruction from said instruction means.

15. The system according to claim 14, wherein said instruction means instructs the start of the measurement on the basis of an external operation.

16. The system according to claim 14, wherein said instruction means instructs the start of the measurement at predetermined time intervals.

17. The system according to claim 13, wherein said group selection means selects the group on the basis of at least an average of the carrier levels within a predetermined period of time.

18. The system according to claim 13, wherein said group selection means selects the group on the basis of at least a maximum value of the carrier levels within a predetermined period of time.

19. The system according to claim 13, wherein said measurement means measures the carrier level when the radio control apparatus is in an idle state.

20. The system according to claim 11, wherein said storage means stores the group which combines a plurality of radio channels free from the influence of intermodulation among the plurality of radio channels used in each of the plurality of radio communication apparatuses.

21. A control method for a radio communication apparatus, storing at least one group including a plurality of radio channels where an influence of intermodulation has been considered when the radio communication apparatus simultaneously performs communication with a plurality of radio communication apparatuses, comprising the steps of:
   selecting a radio channel among the plurality of radio channels included in the group; and
   controlling communication using the radio channel selected in said selecting step.

22. The method according to claim 21, further comprising a group selection step of selecting one group from a plurality of groups stored.

23. The method according to claim 22, further comprising:
   the measurement step of measuring a carrier level of the radio channel, and
   wherein the group selection step selects the group on the basis of a measurement result in the measurement step.

24. The method according to claim 23, further comprising:
   the instruction step of instructing start of the measurement step, and
   wherein the measurement step includes the step of measuring the carrier level in accordance with an instruction in the instruction step.

25. The method according to claim 24, wherein the instruction step includes the step of instructing the start of the measurement in response to an external operation.

26. The method according to claim 24, wherein the instruction step includes the step of instructing the start of the measurement at predetermined time intervals.

27. The method according to claim 23, wherein the group selection step selects the group on the basis of at least an average of the carrier levels within a predetermined period of time.

28. The method according to claim 23, wherein the group selection step selects the group on the basis of at least a maximum value of the carrier levels within a predetermined period of time.

29. The method according to claim 23, wherein the measurement step includes the step of measuring the carrier level when the radio communication apparatus is in an idle state.

30. The method according to claim 21, wherein said storage means stores the group which combines a plurality of radio channels free from the influence of intermodulation among the plurality of radio channels used in each of the plurality of radio communication apparatuses.

31. A control method for a radio communication system having a plurality of radio communication apparatus and a radio control apparatus, the system comprising storage means for storing at least one group including a plurality of radio channels where an influence of intermodulation has been considered when the radio communication apparatus simultaneously performs communication with a plurality of radio communication apparatuses, wherein the radio control apparatus comprises the step of:
   allocating a radio channel in the group to each of the plurality radio communication apparatuses, and
   the radio communication apparatus comprises the step of:

performing radio communication using the radio channel allocated in said allocating step.

32. The method according to claim 31, further comprising a group selection step of selecting one group from a plurality of groups, wherein said storage means stores the plurality of groups and the allocating step allocates a radio channel in the group selected by said group selection step to each of the plurality of radio communication apparatus.

33. The method according to claim 32, wherein said radio control apparatus performs measuring a carrier level of the radio channel, and the group selection step selects the group of radio channels on the basis of a measurement result in the measurement.

34. The method according to claim 33, wherein the group selection step includes an instruction step of instructing start of the measurement, and the measurement includes measuring the carrier level in accordance with an instruction in the instruction step.

35. The method according to claim 34, wherein the second instruction step includes the step of instructing the start of the measurement in response to an external operation.

36. The method according to claim 34, wherein the second instruction step includes the step of instructing the start of the measurement at predetermined time intervals.

37. The method according to claim 33, wherein the measurement step includes the step of measuring the carrier level when the radio communication apparatus is in an idle state.

38. The method according to claim 31, wherein the group selection step selects the group on the basis of at least an average of the carrier levels within a predetermined period of time.

39. The method according to claim 31, wherein the group selection step selects the group on the basis of at least a maximum value of the carrier levels within a predetermined period of time.

40. The system according to claim 31, wherein said storage means stores the group which combines radio channels free from the influence of intermodulation among the plurality of radio channels used in each of the plurality of radio communication apparatuses.

* * * * *